United States Patent [19]

Aiki et al.

[11] Patent Number: 4,857,032

[45] Date of Patent: Aug. 15, 1989

[54] TORQUE VARIATION ABSORBING DEVICE

[75] Inventors: Shigetaka Aiki, Kariya; Kiyonori Kobayashi, Chiryu; Satoshi Kato, Anjo, all of Japan

[73] Assignees: Aisin Seiki Kabushiki Kaisha, Kariya; Toyota Jidosha Kabushiki Kaisha, Toyota, both of Japan

[21] Appl. No.: 71,549

[22] Filed: Jul. 7, 1987

Related U.S. Application Data

[63] Continuation of Ser. No. 766,659, Aug. 19, 1985, abandoned.

[30] Foreign Application Priority Data

Aug. 21, 1984 [JP] Japan ................... 59-174450
Aug. 21, 1984 [JP] Japan ................... 59-174451
Aug. 21, 1984 [JP] Japan ................... 59-174452

[51] Int. Cl.$^4$ .......................... F16D 3/14; F16F 15/12
[52] U.S. Cl. ........................................ 464/68; 74/574; 192/106.2
[58] Field of Search ............... 74/572, 574; 192/106.1, 192/106.2; 464/66, 67, 68

[56] References Cited

U.S. PATENT DOCUMENTS

| | | | |
|---|---|---|---|
| 1,460,131 | 6/1923 | Holy | 464/66 X |
| 1,505,480 | 8/1924 | Manville . | |
| 1,982,658 | 12/1934 | Griswold . | |
| 2,042,570 | 6/1936 | Wemp . | |
| 2,286,502 | 6/1942 | Newton | 192/106.2 |
| 2,321,941 | 6/1943 | Rose | 464/68 |
| 2,437,537 | 3/1948 | Kelleher . | |
| 2,729,079 | 1/1956 | Kuehn . | |
| 3,107,551 | 10/1963 | Cline . | |
| 3,136,178 | 3/1962 | O'Connor . | |
| 3,138,011 | 8/1972 | Stromberg . | |
| 3,754,413 | 8/1973 | Borrini | 464/66 X |
| 3,983,982 | 10/1976 | Worner . | |
| 4,002,043 | 1/1977 | Yoshida . | |
| 4,101,015 | 7/1975 | Radke . | |
| 4,274,524 | 6/1981 | Nakane | 74/574 X |
| 4,351,168 | 9/1982 | Prince et al. | 192/106.2 X |
| 4,445,876 | 5/1984 | Entrup . | |
| 4,468,207 | 8/1984 | Yoshida | 464/66 |
| 4,533,031 | 8/1985 | Nagano . | |
| 4,533,338 | 8/1985 | Hamada | 464/68 X |
| 4,549,641 | 10/1985 | Ootani et al. . | |
| 4,663,983 | 5/1987 | Kobayashi et al. | 192/106.2 X |

FOREIGN PATENT DOCUMENTS

| | | |
|---|---|---|
| 688630 | 2/1940 | Fed. Rep. of Germany . |
| 851872 | 10/1952 | Fed. Rep. of Germany ........ 464/66 |
| 1680669 | 7/1970 | Fed. Rep. of Germany . |
| 800698 | 4/1935 | France . |
| 53-73730 | 6/1978 | Japan . |
| 56-143821 | 4/1980 | Japan . |
| 56-66542 | 6/1981 | Japan . |
| 56-43176 | 10/1981 | Japan . |
| 320066 | 10/1929 | United Kingdom . |
| 1413429 | 11/1975 | United Kingdom . |
| 1426885 | 3/1976 | United Kingdom . |
| 1462014 | 1/1977 | United Kingdom . |
| 2000257 | 1/1979 | United Kingdom . |

OTHER PUBLICATIONS

372 Automotive Engineering 93 (1985) Jan., No., Dallas, Tex., USA.

Primary Examiner—Daniel P. Stodola
Attorney, Agent, or Firm—Burns, Doane, Swecker & Mathis

[57] ABSTRACT

A torque variation absorbing device comprises a driving member, a driven member and a damping mechanism and a torque limiting mechanism interposed between the driving member and the driven member. The damping mechanism comprises a coil spring extending in the circumferential direction of the device and seat members provided at both ends of the coil spring. A center of each end of the coil spring is positioned nearer to a center of mutual rotation between the driving member and the driven member than a center of inclining of the seat member. A ratio of driving side moment of inertia to the driven side moment of inertia is set between 0.7 and 1.4. Further, a gap is provided in the circumferential direction between the seat member of the damping mechanism and at least one of the driving member and the driven member to which the seat member is opposed.

10 Claims, 4 Drawing Sheets

FIG. I

TORQUE VARIATION ABSORBING DEVICE

This application is a continuation of application Ser. No. 766,659, filed Aug. 19, 1985 abandoned.

FIELD OF THE INVENTION

The present invention relates to a torque variation absorbing device which is applied to a flywheel of a vehicle or is used as a damper of a ship in order to absorb vibration of an engine.

BACKGROUND OF THE INVENTION

The present applicants provide a torque variation absorbing device comprising a driving member fixed to a drive shaft, a driven member arranged coaxially with the driving member and rotatably supported on the driving member, and torque limiting mechanism and a damping mechanism interposed between the driving member and the driven member.

In order to improve durability and to ensure good performance of the torque variation absorbing device, the following points are desired to be solved.

As a first point, a coil spring constituting a part of the damping mechanism should be prevented from being deformed excessively outwardly or inwardly and touching the members outside or inside of the coil spring in order to preserve durability and performance of the torque variation absorbing device.

As a second point, in order to absorb effectively vibration of an engine by a hysteresis mechanism, a damping mechanism and a torque limiting mechanism, it is important to determine appropriately a ratio of a moment of inertia of the driving member to that of the driven member as well as to determine specific values of each member. When the ratio is not set appropriately, the resonance point of the vibration absorbing device will be within the operating speed of an engine. As a result, vibration of a vehicle is increased, and in an extreme case, the device cannot endure the resonance.

As a third point, if a coil spring constituting a part of a damping mechanism is engaged with a flat member of a driving member or a driven plate of a driven member with insufficient gap in the circumferential direction therebetween, mutual rotation between the driving plate and the driven plate will be determined only by a compression degree of the coil spring. As a result, the obtained rotational displacement is insufficient for effecting the dampening or absorbing of vibration and resonance.

OBJECTS AND SUMMARY OF THE INVENTION

A first object of the present invention is to prevent a coil spring from being deformed excessively and touching members positioned inside or outside of the coil spring at a high engine speed or at a low engine speed during transmission of a large torque, so as to prevent deterioration in the durability and performance of the torque variation absorbing device.

In order to achieve the above first object, a center of each end of the coil spring is positioned nearer to a center of mutual rotation of the torque variation absorbing device than a center of inclining of a seat member positioned at each end of the coil spring, and a coil spring portion near to the center of mutual rotation is set more compressed than a coil spring portion far from the center of mutual rotation.

Owing to the above arrangement of the center of the end of the coil spring, the coil spring is not deformed excessively in a radially outward direction, even though a large centrifugal force acts upon the coil spring at a high engine speed. On the other hand, owing to the above compression of the coil spring portion near to the center of mutual rotation, the coil spring is slightly deformed outwardly and therefore excessive deformation toward the inside will be prevented even though a large torque is transmitted at a low engine speed.

A second object of the present invention is to absorb vibration effectively.

To achieve the above second object, a ratio of a driving side moment of inertia to a driven side moment of inertia is set between 0.7 and 1.4.

A resonance frequency between the driving side moment of inertia $J_1$ (which includes an inertia of a rotatable member of an engine such as its drive shaft) and the driven side moment of inertia $J_2$ (which includes an inertia of a clutch cover fixed to the vibration absorbing device) is defined as follows:

$$f = \frac{1}{2\pi} \cdot \sqrt{\frac{K(J_1 + J_2)}{J_1 \cdot J_2}}$$

where K is a spring constant of the damping mechanism. When the ratio of $J_1$ to $J_2$ is expressed by A, that is, $A = J_1/J_2$, the above equation can be expressed as follows:

$$f = \frac{1}{2\pi} \cdot \frac{\sqrt{K}}{\sqrt{J_1 + J_2}} \cdot \frac{1+A}{\sqrt{A}}$$

In this equation, when A is set between 0.7 and 1.4, the resonance frequency f can be brought into the lowest range of frequency and resonance can be effectively suppressed.

A third object of the present invention is to absorb vibration effectively by fixing a resonance point below the usual operating range of engine speed.

In order to achieve the above third object, a gap is provided in a circumferential direction between a coil spring and an opposed member consisting of a driving member or a driven member.

By providing the above circumferential gap, the coil spring is not compressed by the length of the gap during the first stage of torque transmission and therefore mutual rotation between the driving member and the driven member takes place during the first stage of torque transmission without compression of the coil spring. After the driving member and the driven member contact both ends of the coil spring, the coil spring begins to be compressed. Accordingly, the amount of total mutual rotational displacement $\theta_0$ is equal to a sum of the gap $\theta_1$ and the compression deformation $\theta_2$. When the ratio $\theta_1/\theta_0$ is nearly equal to 0, a resonance frequency is near to an idle frequency $f_E$ of engine speed, while in the range of $\theta_1/\theta_0 = 0.3$, a resonance frequency is brought to a much lower frequency than the idle frequency $f_E$ pl with the result that effective vibration absorbing can be attained.

BRIEF DESCRIPTION OF THE DRAWINGS

The above and other objects, features and advantages of the present invention will be become apparent and more readily appreciated from the following detailed description of preferred exemplary embodiments of the invention, taken in conjunction with the accompanying drawings, in which.

The preferred embodiments will be explained hereinafter in reference to the drawings.

DETAILED DESCRIPTION OF THE PREFERRED EMBODIMENTS

Figure 1:
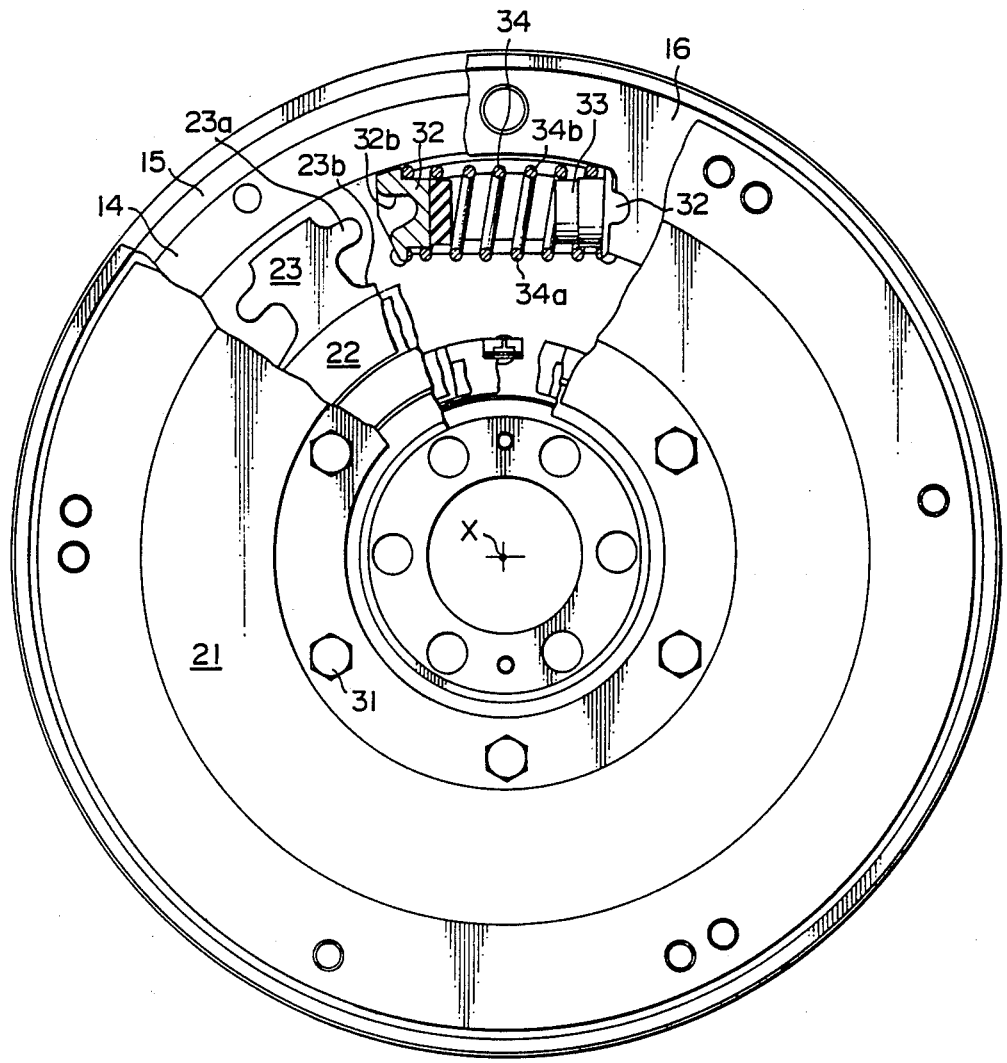
FIG. 1 is a fragmentary elevational view of a preferred embodiment of the present invention.
Figure 2:
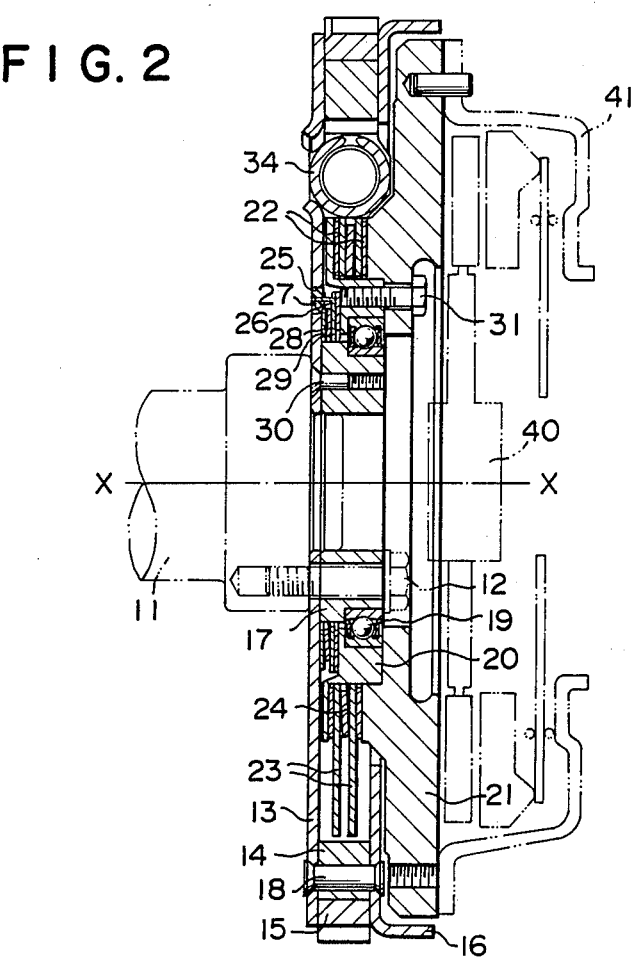
FIG. 2 is a sectional view of the device of FIG. 1.

Referring to FIG. 1 and FIG. 2, there is provided an overall construction of a torque variation absorbing device which cooperates with a flywheel of a vehicle. A driving member fixed to a drive shaft 11 by a bolt 12 comprises a first driving plate 13, an outer ring 14, a second driving plate 16, a pin 18 for fixing these three parts 13, 14 and 16 together, a ring gear 15 fixed to an outer surface of the outer ring 14 and an inner ring 17 fixed to an inner portion of the first driving plate 13 by a bolt 30. At an outer surface of the inner ring 17, a driven member is arranged via a ball bearing 19 coaxially with the driving member and rotatably with respect to the driving member. The driven member comprises a driven plate 20 supporting the bearing 19 and a flywheel 21 which is fixed to the driven plate 20 by a bolt 31.

A torque limiting mechanism, a damping mechanism for suppressing vibration and a hysteresis mechanism are interposed between the driving member and the driven member.

The torque limiting mechanism comprises abrasive linings 22 supported by the driven disks 23, which linings 22 are pushed by the driven plate 20 and the flywheel 21, the driven disks 23 and a cone spring 24 pushing the driven disks 23. The damping mechanism comprises a coil spring 34 and a seat member 32 with a rubber element 33, the seat member 32 being located in windows 23b, 23b, 13b, 16b provided in the driven disk 23 and the first and the second driving plates 13 and 16. The hysteresis mechanism, which is necessitated when the driving member and the driven member rotate mutually, comprises a thrust plate 26 having a damping resin cap 27 which engages the first driving plate 13, an abrasive member 25 interposed between the thrust plate 26 and the driven plate 20, a cone spring 28 for providing a pushing force and a washer 29.

A clutch cover 41 is fixed via a clutch disk 40 to the flywheel 21 for transmitting or interrupting the delivery of engine torque to a transmission not shown.

Figure 3:
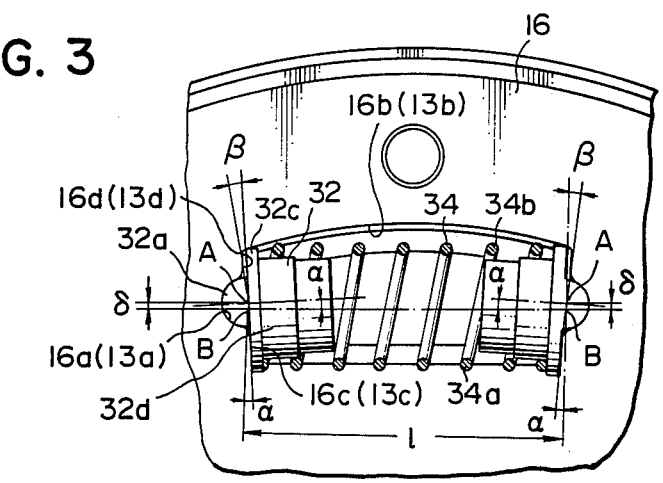
FIG. 3 is a detail view in the vicinity of a damping mechanism of the device of FIG. 1.

Referring to FIGS. 1 and 2, in order to achieve the first object of the present invention, that is, to prevent excessive outward or inward deformation of the coil spring 34, the arrangement shown in FIG. 3 is adopted. The seat member 32 includes convex rounded portions 32a which can contact concave rounded portions 13a, 16a of the first and the second driving plates 13 and 16, a flange portion 32c which contacts an end of coil spring 34 at one surface of the flange portion and engages window portions 13c, 16c of the first and the second driving plates 13 and 16 in order to prevent an excessive inclining rotation of the seat member 32, a guide portion 32d fixed with the rubber 33 and guiding the coil spring 34, and a concave portion 32b for receiving a convex portion 23a of the driven disk 23. The guide portion 32d is constructed such that a center B of each end of the coil spring 34 is positioned by a distance δ nearer to a center of mutual rotation X than an inclining rotation center A of the convex rounded portion 32a. Further, an axis of the flange portion 32c of the seat members 32 positioned at each end of the coil spring 34 is set with an angle α with respect to a line passing through the centers B, B of both ends of the coil spring 34 to prevent surfaces of both ends of the coil spring 34 from becoming parallel to each other. The angle α is given to the flange portion by providing an angle α to radially inner portions of the windows 13c and 16c inclined with respect to parallel planes which are determined by a common distance 1 such that a coil spring portion 34a near to the center of mutual rotation X is more compressed than a coil spring portion 34b far from the center of mutual rotation X. Between the flange portion 32c of the seat member 32 and radially outer portions of the windows 13d and 16d, an angular gap equal to an angle β is provided so that the radially outer portions of the windows 13d and 16d do not push the seat member 32 even when the largest amount of mutual rotation takes place between the driving member and the driven member.

In the above arrangement, more than half of the end surface of the coil spring 34 is positioned nearer to the center of mutual rotation X than the center of the seat member 32. Accordingly, even if a large centrifugal force acts on the coil spring 34 at a high engine speed, the coil spring 34 will not be deformed excessively outward in the radial direction of the torque variation absorbing device, because the portion of the seat member 32 near to the center of mutual rotation X contacts the radially inner portions of the windows 13c and 16c in the first and the second driving plates 13 and 16 and therefore are unlikely to incline. On the other hand, the end surface of the coil spring 34 is inclined by the angle α. Accordingly, even if a large torque at a low engine speed compresses the coil spring 34, the length of the coil spring portion 34a nearer to the center of mutual rotation X and the length of the coil spring portion 34b further from the center of mutual rotation X become nearly equal with the result that an excessive deformation of the spring toward the center of mutual rotation X is prevented.

The test executed to confirm the effect of the present invention showed that for a torque variation absorbing device with a 100 mm distance between the center of mutual rotation X and the axis of coil spring 34, with a 20 mm length of the coil spring 34, with a 26 mm diameter of the coil spring 34 and with an about 1.2 kg/mm spring constant in the coil spring 34, the best characteristic of deformation was obtained when δ=1.5 mm and α=3 degrees.

There may be another method different from the present invention to achieve the first object of the invention, for example, increasing the diameter of the coil spring to prevent excessive deformation of the coil spring. However, such a method increases the space needed for the spring, and the power requirements of the device will inevitably be enlarged. On the other hand, according to the present invention, only the position of the coil spring and the angle of the seat member need to be appropriately set and no need arises for increased space and power.

In order to achieve the second object of the present invention, that is, to attain effective absorbing of vibration, the following arrangement is provided by the present invention.

Power of an engine is transmitted from the drive shaft 11 to the driving member 13, 14 and 16. The rim portions of the windows 13b and 16b provided in the first and the second driving plates 13 and 16 push the seat member 32 positioned at one end of the coil spring 34. The coil spring 34 is compressed and the power is transmitted through the coil spring 34 and the seat member 32 positioned at the other end of the coil spring 34 to the driven disk 23. The torque limiting mechanism is designed to effect a slip at a torque larger than that of the largest output of the engine, while at a torque smaller than that of the largest output of an engine the torque limiting mechanism rotates together with the flywheel 21 and the power received by the driven disk 23 is transmitted to the flywheel 21 and further to the clutch cover 41 fixed to the flywheel 21. Variations in power such as those from engine vibration is damped by the coil spring 34. Also, engine vibration is effectively absorbed when the driving member and the driven member rotate mutually to each other due to the elongation and compression of the coil spring 34 and hysteresis takes place in the hysteresis mechanism.

When engine speed increases from a starting speed to an idling speed, the frequency of rotation of the torque vibration absorbing device passes through a point of resonance.

The power transmitted from the drive shaft to the flywheel 21 becomes a plurality of times the maximum engine output at a resonance point, and in order to reduce excessive torque at the resonance point, the torque limiting mechanism is provided.

Referring to FIGS. 1 and 2, the power transmission route is divided into two parts by the coil spring 34 with respect to moment of inertia. Members comprising a drive side moment of inertia $J_1$ include an engine rotational member such as the drive shaft 11, the driving member 13, 14, 16 and 17, the ring gear 15, the bolts 12 and 30, the pin 18, the thrust plate 26, the cone spring 28 and the washer 29. Members comprising a driven side moment of inertia $J_2$ include the flywheel 21, the driven plate 20, the bolt 31, the abrasive lining 22, the driven disk 23, the cone spring 24 and the clutch cover 41. With respect to the bearing 19, the lining 25, the coil spring 34, the seat member 32 and the rubber element 33, one half moment of inertia of each of the members should be counted with the driving side moment of inertia $J_1$ and the other half moment of inertia of the members should be counted with the driven side moment of inertia $J_2$.

Figure 4:
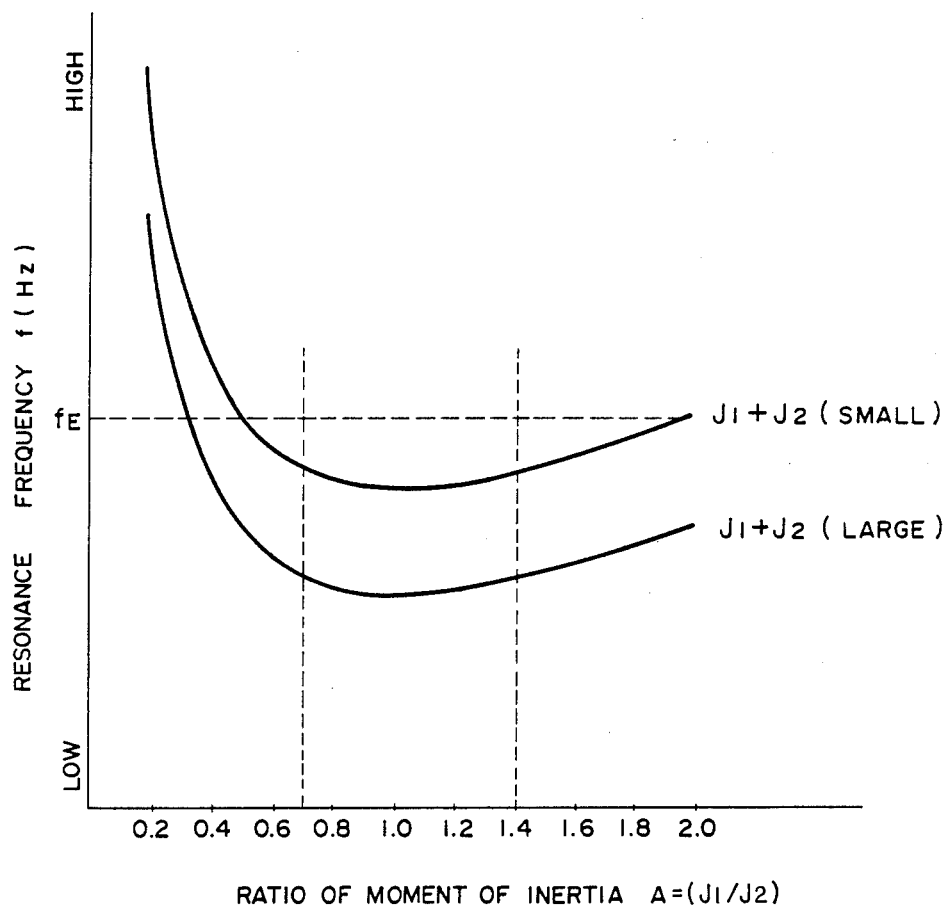
FIG. 4 is a graph showing a relationship between a ratio of moment of inertia and a resonant frequency.

With the above mentioned arrangement, the ratio A of the driving side moment of inertia $J_1$ to the driven side moment of inertia $J_2$ ($A = J_1/J_2$) is set between 0.7 and 1.4. Through this arrangement, the resonance frequency of the torque variation absorbing device can be set low as shown in FIG. 4. FIG. 4 shows that the lower and upper limits of the range where a resonant frequency of the torque variation absorbing device is kept low are 0.7 and 1.4.

Another method to achieve the second object of the present invention is to make the sum of the driving side moment of inertia $J_1$ and the driven side moment of inertia $J_2$ large. However, if such a method is adopted, it becomes necessary to increase the weight and the capacity of the device. As a result, the device must be enlarged, thereby creating problems with mounting space and with deterioration of the accelerating characteristics of a vehicle.

On the other hand, in the present invention, only an adjustment of the ratio of moment of inertia is required and therefore no excessive increase of weight or capacity is needed.

To achieve the third object of the present invention, that is, to attain effective absorbing of vibration, the following arrangement is provided. The seat member 32 has the convex rounded portion 32a which is opposed to and can contact the concave rounded portions 13a and 16a of the first and the second driving plates 13 and 16. The seat member 32 also has a concave portion 32b which receives the convex portion 23a of the driven disk 23. An angular gap of $\theta_1 (=0.17$ radian) in the circumferential direction is provided between the driven disk 23 and the seat member 32.

In the above arrangement, when torque is transmitted from the driving shaft 11 to the first and the second driving plates 13 and 16, the second driving plates 13 and 16 push the coil spring 34. At that time, since there is a gap $\theta_1$ in the circumferential direction between the driven disk 23 and the seat member 32, mutual rotation takes place between the driving plates 13 and 16 and the flywheel 21, and therefore only the torque due to hysteresis of the hysteresis mechanism is transmitted to the flywheel 21. After mutual rotation equal to $\theta_1$ takes place and the seat member 32 contacts the driven disk 23, the coil spring 34 begins to be compressed and the torque is transmitted from the coil spring 34 via the driven disk 23 to the flywheel 21. The compression angle $\theta_0$ of the coil spring 34 is about 0.26 radian and the ratio of $\theta_1/\theta_0$ becomes about 0.4, where $\theta_0$ is the total mutual rotation $\theta_0 (=\theta_1+\theta_2)$ of 0.43 radian. Since the range of mutual rotation can be designed wide enough, the resonance point comes to the range much lower than the idling frequency of the engine with the result that sufficient absorbing of vibration is possible.

Figure 5:
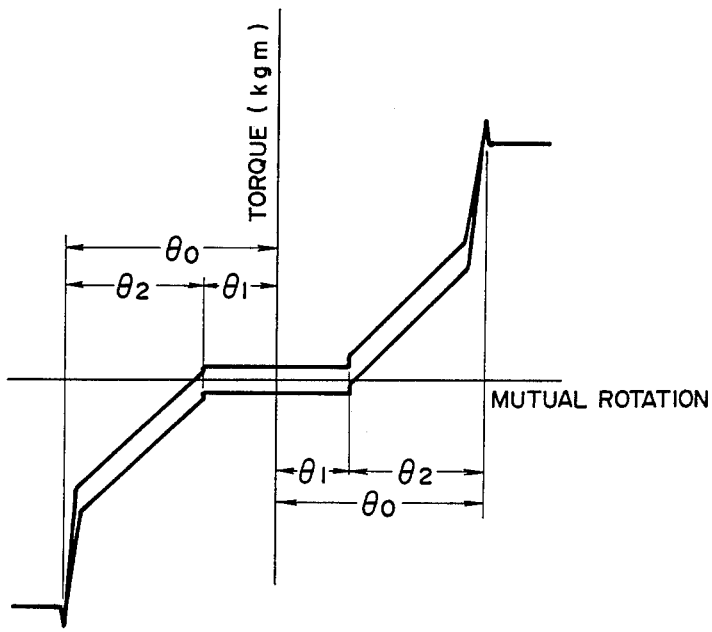
FIG. 5 is a graph showing a relationship between a mutual rotational displacement and a transmitted torque.
Figure 6:
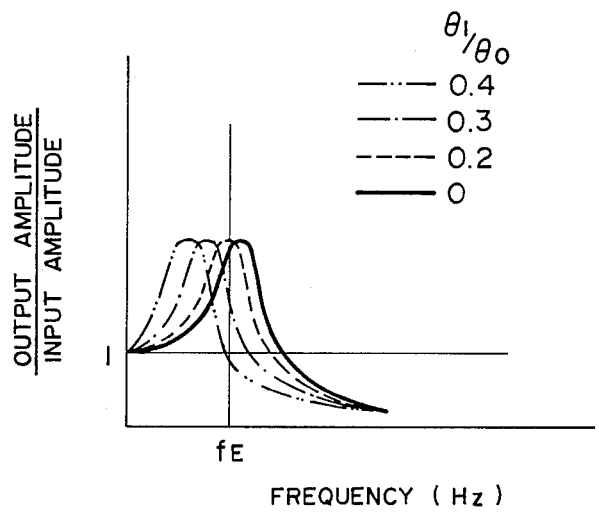
FIG. 6 is a graph showing a relationship between a frequency and a ratio of output amplitude to input amplitude.

The whole mutual rotation $\theta_0$ between the driving member and the driven member is the sum of the mutual rotation $\theta_1$ due to the gap and the mutual rotation $\theta_2$ due to the compression of the coil spring 34 as shown in FIG. 5. A relationship between a ratio $\theta_1/\theta_0$ and an amplification (a ratio of an output amplitude to an input amplitude) is shown in FIG. 6. As apparent from FIG. 6, a resonance point is in a range near to an idling frequency $f_E$ of an engine when the ratio $\theta_1/\theta_0$ is nearly equal to 0, while a resonance point comes to a much lower frequency than engine idling frequency $f_E$ when the ratio is not smaller than 0.3. Therefore, effective absorbing of vibration becomes possible when the ratio is not smaller than 0.3.

To achieve the above third object of the present invention, it may be considered effective to lengthen the whole length of the coil spring. However, according to such a method, buckling of the coil spring is likely to occur and a large space to receive the long coil spring will be needed. To the contrary, all to be needed in the present invention is to provide a gap in the circumferential direction between the seat member and the members to which the seat member is opposed.

Although only preferred embodiments of the present invention have been described in detail, it will be appreciated by those skilled in the art that various modifications can be made to the particular embodiments shown without materially departing from the novel teachings and advantages of the present invention. Accordingly, it is to be understood that all such modifications and alterations are included within the scope of the present invention as defined by the following claims.

What we claim is:

1. A torque variation absorbing device comprising:
   a driving member fixed to a drive shaft, said driving member defining a window therein;
   a driven member arranged coaxially with and rotatable relative to said driving member; and
   a torque limiting mechanism and a damping mechanism interposed between said driving member and said driven member, said damping mechanism including a coil spring having first and second ends and a seat member having a rounded convex portion and a flange portion, said seat member being capable of inclining around an inclining center defined by a center of curvature of said convex portion according to relative rotation between said driving member and said driven member, a center of each end of said coil spring being offset from said inclining center of said seat member toward a center of relative rotation between said driving member and said driven member, said seat member being set at said window of said driving member with an axis of said flange portion set at an angle with respect to a line connecting centers of said first and second ends of said coil spring by pre-constructing a portion of said driving member defining an end of said window to incline by said angle with respect to a plate perpendicular to the line connecting the center first and second ends of said coil spring such that a coil spring portion close to said center of relative rotation is set to be compressed more than another coil spring portion far from said center of relative rotation.

2. The torque variation absorbing device as claimed in claim 1, wherein said driving member comprises a first driving plate having a second window therein, and wherein circumferentially opposed edges of said first and second windows Which are in detachable contact with a radially inner portion of said flange portion incline by the same angle as said angle from parallel planes extending at a right angle to the line connecting the centers of the first and second ends of said coil spring so as to compress said coil spring portion close to said center of relative rotation more than said coil spring portion far from said center of relative rotation.

3. The torque variation absorbing device as claimed in claim 2, wherein an angular gap is provided between a radially outer portion of said flange portion and each of said circumferentially opposed edges of said first and second windows in said first and second driving plates such that said angular gap remains even when maximum relative rotation takes place between said driving member and said driven member.

4. A torque variation absorbing device comprising:
   a driving member fixed to a drive shaft and having first and second driving plates which define windows therein and inner and outer rings, said outer ring being clamped between said first and second driving plates, said inner ring being fixed to said first driving plate;
   a driven member arranged coaxially with said driving member and rotatably supported via a bearing by said driving member so as to rotate relative to said driving member around a center of relative rotation between said driving and driven members;
   a driven disk arranged between and supported rotatably relative to said driving member and said driven member; and
   a torque limiting mechanism interposed between said driven disk and said driven member, a plurality of substantially identical damping mechanisms arranged on a common circle and interposed between said driving member and said driven disk, and a hysteresis mechanism interposed between said driving member and said driven member, said torque limiting mechanisms being located radially inside said damping mechanisms, each of said damping mechanisms including a coil spring with first and second ends and first and second seat members positioned at said first and second ends of said coil spring, respectively, each of said damping mechanisms being set at said windows defined in said driving plates such that said first and second seat members are in detachable contact with said driving member and such that an angular gap is provided in a circumferential direction of the torque variation absorbing device between at least one of said first and second seat members and said driven disk, said coil spring including a first coil spring portion close to said center of relative rotation and a second coil spring portion displaced from said center of relative rotation, each of said first and second seat member having a convex portion and being capable of inclining around an inclining center defined by a center of curvature of said convex portion, each of said first and second seat members being set at said windows of said driving member with an axis of each of the seat members set at an angle with respect to a line connecting centers of said first and second ends of said coil spring by pre-constructing a portion of said driving member defining an end of each of said windows to incline by said angle with respect to a plane perpendicular to the line connecting the centers of said first and second ends of said coil spring such that said first coil spring portion is set to be compressed more than said second coil spring portion.

5. The torque variation absorbing device as claimed in claim 4, wherein a ratio of a relative rotational displacement $\theta_0$ between said driving member and said driven member due to said angular gap to an entire relative rotational displacement $\theta_0$ between said driving member and said driven member is at least 0.3.

6. The torque variation absorbing device as claimed in claim 4, further comprising:
   a driving side including said driving member,
   a driven side including said driven member
   said driving side and said driven side having predetermined moments of inertia, a ratio of the driving side moment of inertia to the driven side moment of inertia being between 0.7 and 1.4.

7. The torque variation absorbing device as defined in claim 6, wherein said outer ring is fixed to a radially outer portion of said first driving plate, and said inner ring is fixed to a radially inner portion of said first driving plate, said second driving plate being fixed to said first driving plate via said outer ring, said first driving plate, said outer ring and said second driving plate being fixed together by a pin member, said inner ring being fixed to said first driving plate by a bolt member, and a ring gear being fixed to an outer surface of said outer ring.

8. The torque variation absorbing device as claimed in claim 7, wherein members constituting said driving side moment of inertia include engine rotational members said drive shaft, said driving member, a fastening bolt connecting said driving member to said drive shaft, a portion of said hysteresis mechanism, a portion of said damping mechanism, a portion of an abrasive member of said hysteresis mechanism, and a portion of said bearing.

9. The torque variation absorbing device as claimed in claim 6, wherein said driven member comprises a driven plate rotatably mounted on said driving member, a flywheel fixed to said driven plate, and a fastening means for fixing said flywheel to said driven plate.

10. The torque variation absorbing device as claimed in claim 9, wherein members constituting said driven side moment of inertia include said driven member, a clutch cover fixed to said flywheel, said torque limiting mechanism, said driven disk, a further portion of said damping mechanism, a further portion of an abrasive member of said hysteresis mechanism, and a further portion of said bearing rotatably mounting said driven member on said driving member.

* * * * *